July 13, 1965
H. O. CORBETT
3,193,878
DUAL EXTRUSION DIE
Filed Oct. 23, 1962
3 Sheets-Sheet 1
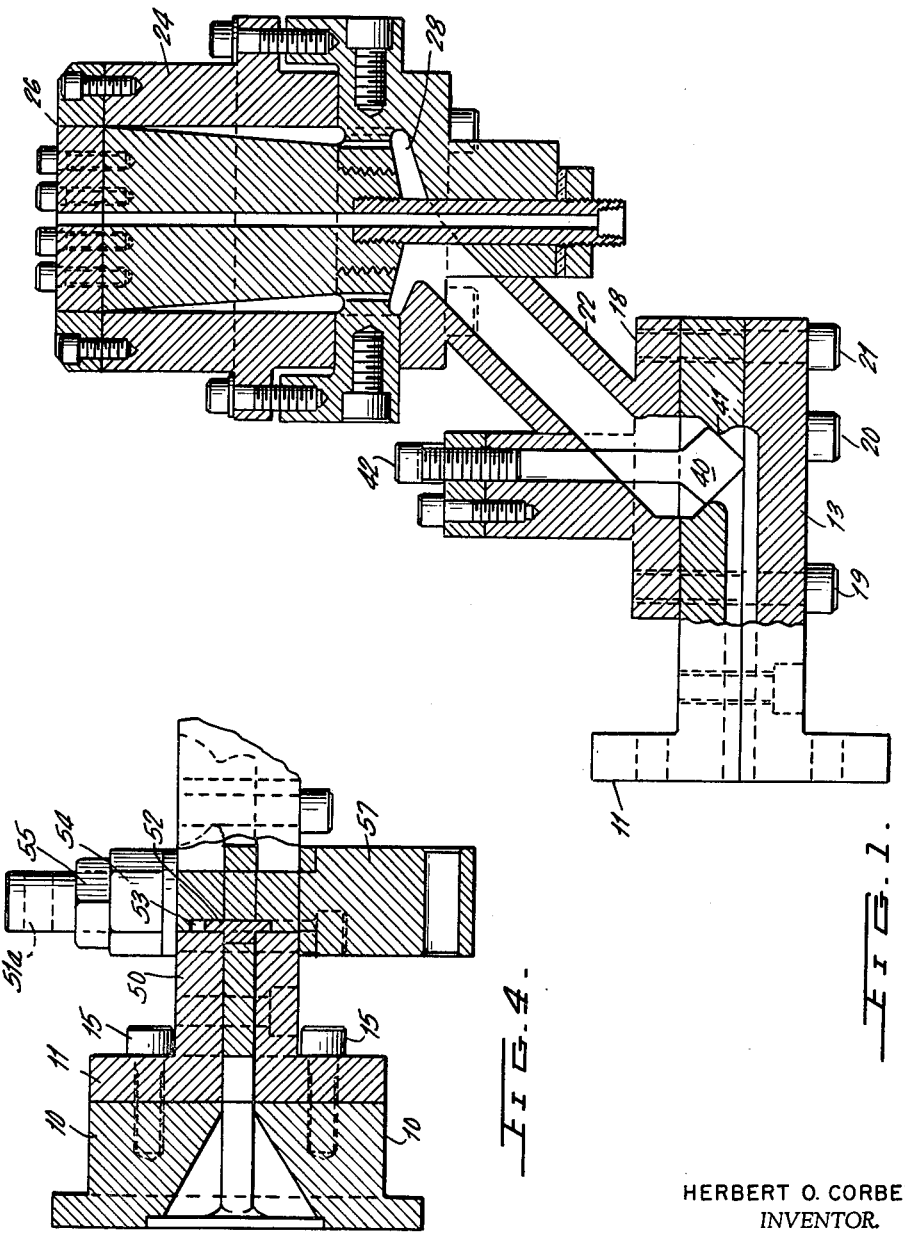
HERBERT O. CORBETT
INVENTOR.
BY Lawrence Rosen

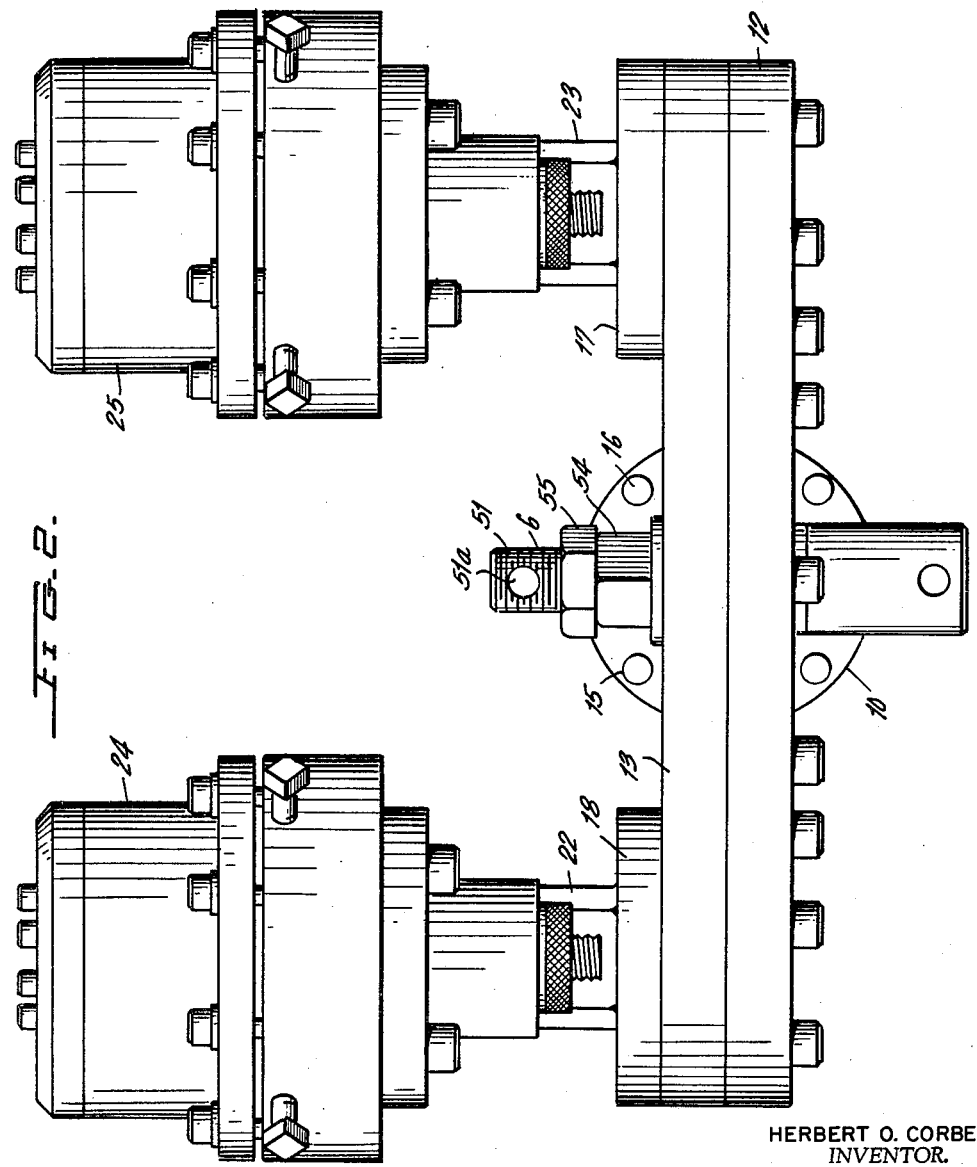

July 13, 1965
H. O. CORBETT
3,193,878
DUAL EXTRUSION DIE
Filed Oct. 23, 1962
3 Sheets-Sheet 3
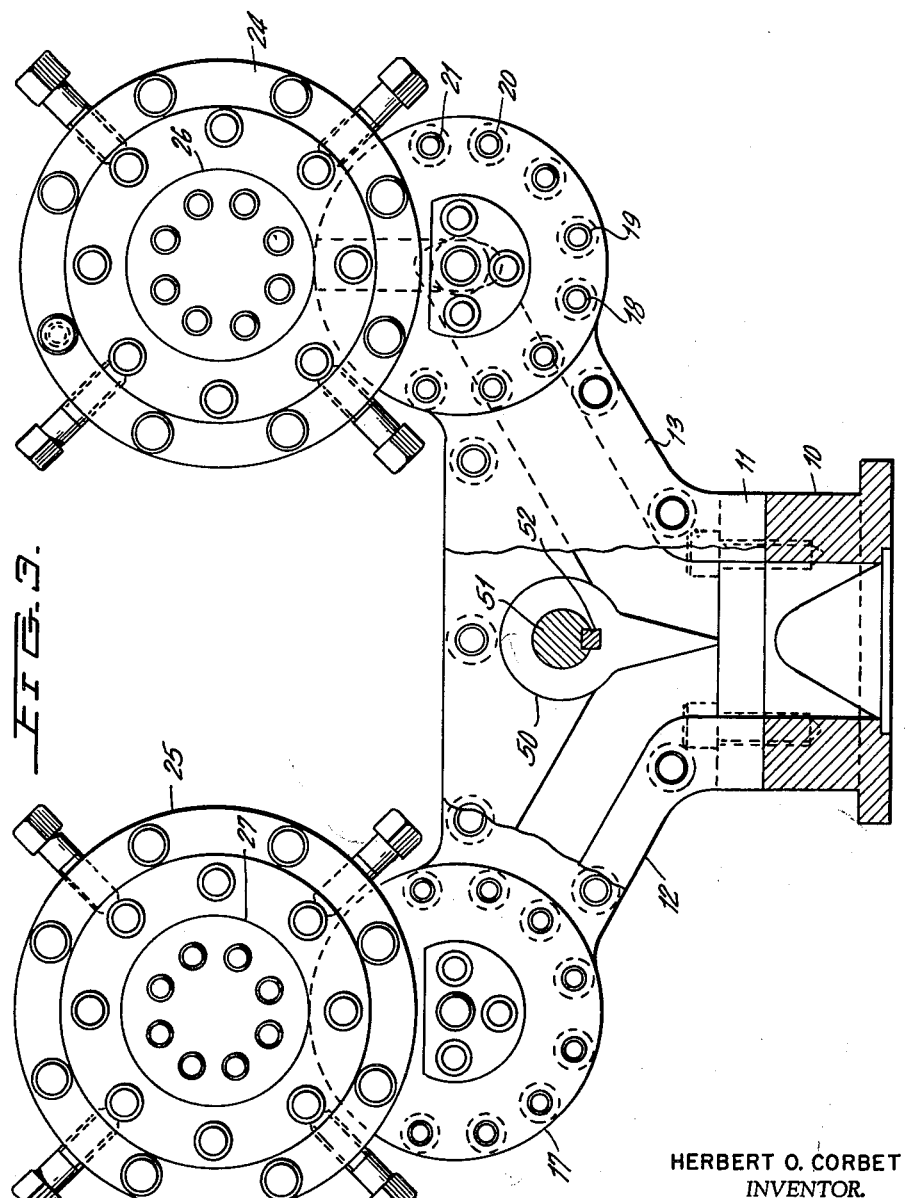
HERBERT O. CORBETT
INVENTOR.
BY Lawrence Rosen United States Patent Office 3,193,878
Patented July 13, 1965

3,193,878
DUAL EXTRUSION DIE
Herbert O. Corbett, Canandaigua, N.Y., assignor to National Distillers and Chemical Corporation, New York, N.Y., a corporation of Virginia
Filed Oct. 23, 1962, Ser. No. 232,414
4 Claims. (Cl. 18—14)

This invention relates to a novel dual extrusion die which provides first and second die members having adjustable head center distances for mounting on a common extruder and which use a common system of nip rolls, presses and other film processing equipment.

The extrusion of tubes of thermoplastic materials is well known in the art wherein an extrusion line will include a source of molten resin which is extruded through a circular die as a tube of thermoplastic material. This single tube is then carried upwardly through a set of nip rolls to various auxiliary equipment such as presses, sealers for placing transverse seals on the collapsed tube, appropriate knives, rolls or stackers, etc.

A given extrusion line will have a given tube diameter capacity. In many cases, the particular size of tube being drawn is smaller than the major diameter. Therefore, the total production of the line is necessarily decreased by the unused portion of the line capacity, since the film could move through the line at the same speed regardless of the diameter of the tube.

The principle of the present invention is to provide a novel dual extruding die which has two extruding heads for extruding two independent tubes of plastic film. The sum of the diameters of the two tubes being drawn will necessarily be somewhat less than the diameter of the largest tube that can be taken through the line. Thus, the two independent tubes can be extruded in the dual die, but can utilize, at one and the same time, all of the components of the line such as the nip rolls and the press where the two extruded tubes are running parallel. The novel invention, therefore, permits a substantial increase in the output of a line where the tube diameters being extruded are less than the tube diameter capacity of the line.

An important feature of the invention lies in the adjustability of the head center distance between the tubes so that the tubes can be appropriately located with respect to one another where different diameters are being drawn.

Moreover, the two dies are fed from a source of molten resin through a novel flow balancing valve which permits adjustment of flow between the heads to thereby permit matching or varying volumes extruded through the die orifices.

Each of the die heads themselves may be formed in the usual manner with the two individual die heads being mounted on the novel die-receiving structure and resin-distributing structure.

Accordingly, a primary object of this invention is to substantially increase the capacity of a given extrusion line when tube diameters smaller than the maximum diameter capacity of the line are being used.

Another object of this invention is to utilize the equipment of a single line for the simultaneous extrusion of two independent tubes.

A further object of this invention is to provide a dual die structure which has an adjustable distance between the center of the two die heads.

Another object of this invention is to provide a novel flow balance means for distributing molten resin from a common source to two independent die heads.

These and other objects of this novel invention will become apparent from the following description when taken in connection with the drawings, in which:

FIGURE 1 shows a side cross-sectional view through one of the die heads of the dual die construction of the invention.

FIGURE 2 shows a side plan view of the novel dual die arrangement of the invention.

FIGURE 3 shows a top view partially in cross-section of FIGURE 2.

FIGURE 4 shows a cross-sectional view across the lines 4—4 in FIGURE 3, and particularly illustrates the flow distributing valve.

Referring now to the figures, there is illustrated the novel dual extrusion die as being carried from a standard die base mount 10 which has appropriate flange means for permitting its connection to a standard type of extruder which provides a source of molten resin.

A feed manifold 11 which has extending manifold halves 12 and 13 respectively is connected to die base mount 10 by appropriate bolt means such as the bolts 15 and 16 shown in FIGURES 2 and 4 which pass through a ring of openings in the feed manifold base and are threaded into registering threaded openings in the die base 10.

Manifold portions 12 and 13 then carry the mounting plates 17 and 18 respectively at their outer ends by a series of bolts which pass through the end of the manifold halves and into their respective mounting plates. By way of example, the mounting plate 18 is connected to manifold half 13 by means of bolts such as bolts 19, 20 and 21. Each of the mounting plates 17 and 18 then have a conduit extending outwardly therefrom such as conduit 22 which is best shown in FIGURES 2 and 4 for the conduit extending from mounting plate 18 and conduit 23 which extends from mounting plate 17, as best shown in FIGURE 2.

The conduits 22 and 23 then communicate with and support extrusion dies 24 and 25 respectively which are illustrated to be of the type which has been fully described in copending application, Serial No. 219,469, filed August 27, 1962, entitled "Balance Flow Die," and assigned to the assignee of the present invention. Details of the die structure can be had from the aforementioned application. For purposes of the present invention, it is necessary only to understand that the extrusion dies 24 and 25 have extrusion orifices 26 and 27 respectively where, as best shown in FIGURE 1 for the case of die 24, the orifice 27 extends downwardly to a chamber 28 which communicates with the interior of conduit 22.

The interior of conduit 22, as is further shown in FIGURE 1, communicates with the interior of manifold section 13, while, as shown in FIGURE 3, the interior of manifold section 13 as well as the interior of manifold section 12 communicate with the interior of the die base mount 10 which is fed with molten plastic from an appropriate extruder.

Accordingly, it is clear that the plastic melt can be transmitted from the extruder to the orifices 26 and 27 of dies 24 and 25 where each of the individual dies operates to extrude its own respective tube of plastic film. The two tubes of film extruded by these two dies may then be carried in parallel through the common equipment of the line which would normally be used for a single tube of larger diameter film which would have normally been extruded by a single extrusion die secured to the die base mount 10. Thus, where smaller diameter films can be extruded to permit the parallel operation provided by the present invention, it will be apparent that the production of a single system can be considerably increased.

In order to control the distance between the two parallel films being extruded, the mounting plates 17 and 18 can be rotated by removing their retaining bolts and rotating the assembly to the next bolt position, whereby the center spacing between dies 24 and 25 can be changed to the desired amount for the two tubes being drawn. It will be obvious that dies 24 and 25 can extrude different diameter tubes, whereby the structure lends itself to great manufacturing flexibility.

Each of the conduits 22 and 23 which supply dies 24 and 25 respectively are provided with respective control valves such as valve 40 which is adjustably positioned with respect to ring seat 41 by screw 42. Details of this construction of this type of valve which controls the flow to a single die is more fully set forth in co-pending application, Serial No. 219,469, filed August 27, 1962, entitled Balanced Flow Die and assigned to the assignee of the instant invention.

A further and novel valve structure is provided in the present invention for appropriately dividing the flow of molten resin into manifold sections 12 and 13. More specifically, a valve member 50 is secured to rotatable pin 51 by means of a T-shaped key 52 (FIGURE 4) in keyway 53 in pin 51. The pin 51 is rotatably received by the manifold frame 13 with nuts 54 and 55 being threadably received by pin 51 to secure it, and thus valve 50 in a predetermined adjusted position. The end of pin 51 then has a tool-receiving opening 51a to permit adjustment of the position of valve 50.

In operation, it will be apparent that the valve member 50 can be rotated about its axis to divide the flow between manifolds 12 and 13 in a highly accurate, controlled manner.

Although preferred embodiments of the novel invention have been described above, many variations and modifications will now be obvious to those skilled in the art, and it is intended to be limited not by the specific disclosure herein but only by the appended claims.

What is claimed is:

1. In combination: a single extruder and a plurality of extrusion dies; said single extruder being connected to a manifold input; said manifold input being connected to a plurality of manifold outputs; angularly adjustable connection means for connecting each of said manifold outputs to a respective extrusion die receiving conduit; each of said extrusion die receiving conduits being elongated members extending laterally from their said respective angularly adjustable connection means; each of said angularly adjustable connection means defining parallel axes of rotation for said respective extrusion die receiving conduits each of said extrusion die receiving conduits receiving a respective extrusion die of said plurality of extrusion dies whereby a plurality of independent extrusions can be derived from said single extruder; each of said extrusion die receiving conduits being angularly adjustable around their said respective manifold output whereby the center to center separation between said plurality of independent extrusions can be changed.

2. In combination: a single extruder and a plurality of extrusion dies; said single extruder being connected to a manifold input; said manifold input being connected to a plurality of manifold outputs; angularly adjustable connection means for connecting each of said manifold outputs to a respective extrusion die receiving conduit; each of said extrusion die receiving conduits being elongated members extending laterally from their said respective angularly adjustable connection means; each of said angularly adjustable connection means defining parallel axes of rotation for said respective extrusion die receiving conduits each of said extrusion die receiving conduits receiving a respective extrusion die of said plurality of extrusion dies whereby a plurality of independent extrusions can be derived from said single extruder; each of said extrusion die receiving conduits being angularly adjustable around their said respective manifold output whereby the center to center separation between said plurality of independent extrusions can be changed; and single valve means connected at said connection between said manifold input and said plurality of manifold outputs for distributing flow of molten plastic between said plurality of manifold outputs.

3. A dual extrusion die comprising a first and second extrusion die having respective outwardly disposed mounting arms; a common extruder means; pivotal connection means pivotally connecting said mounting arms to said common extruder means; said common extruder forcing molten plastic through each of said outwardly disposed mounting arms extending laterally from their said respective pivotal connection means; said respective pivotal connection means for said outwardly disposed mounting arms defining parallel axes of rotation for said respective mounting arms; said respective mounting arms to said first and second extrusion dies; said outwardly disposed pivotally mounted mounting arms being adjustable with respect to one another to adjust the separation between said first and second extrusion dies.

4. A dual extrusion die comprising a first and second extrusion die having respective outwardly disposed mounting arms; a common extruder means; pivotal connection means pivotally connecting said mounting arms to said common extruder means; each of said outwardly disposed mounting arms extending laterally from their said respective pivotal connection means; said respective pivotal connection means for said outwardly disposed mounting arms defining parallel axes of rotation for said respective mounting arms; said common extruder forcing molten plastic through each of said respective mounting arms to said first and second extrusion dies; said outwardly disposed pivotally mounted mounting arms being adjustable with respect to one another to adjust the separation between said first and second extrusion dies; and single valve means connected to said common extruder means for dividing flow from said common extruder means between said outwardly disposed mounting arms.

References Cited by the Examiner

UNITED STATES PATENTS

| 278,667 | 5/83 | Olzewski | 18—14 |
|---|---|---|---|
| 1,755,464 | 4/30 | Williams | 137—612 |
| 2,214,736 | 9/40 | Carmichael et al. | 137—612 |
| 2,636,218 | 4/53 | Orsini | 18—14 |
| 2,724,860 | 11/55 | Strong | 18—5 |
| 2,952,873 | 9/60 | Porter | 18—14 |
| 2,980,955 | 4/61 | Sanko | 18—5 |
| 3,054,143 | 9/62 | Stenger | 18—14 |

FOREIGN PATENTS

| 167,564 | 4/56 | Australia. |
|---|---|---|

MICHAEL V. BRINDISI, *Primary Examiner.*